United States Patent [19]

Miller et al.

[11] 4,427,547

[45] Jan. 24, 1984

[54] BACKWASHING-TYPE FILTERING APPARATUS WITH FILTER SUPPORT GRID OF RING-LIKE SEGMENTS

[75] Inventors: Wendell R. Miller, Denver; Alphonso L. Martinez, Littleton, both of Colo.

[73] Assignee: Quantum Systems Corporation, Denver, Colo.

[21] Appl. No.: 375,554

[22] Filed: May 6, 1982

Related U.S. Application Data

[62] Division of Ser. No. 342,484, Jan. 25, 1982.

[51] Int. Cl.³ .................... B01D 25/02; B01D 27/12
[52] U.S. Cl. ................... 210/411; 210/437; 210/448; 210/456; 210/457; 210/488
[58] Field of Search ............ 55/302, 385 B, 387, 55/389, 521; 210/282, 411, 412, 427, 437, 446–448, 451, 452, 456, 457, 483, 488, 497.01, 542

[56] References Cited

U.S. PATENT DOCUMENTS

| | | | |
|---|---|---|---|
| 427,447 | 5/1890 | Thomson | 210/448 |
| 869,165 | 10/1907 | Etter | 210/497.01 X |
| 872,437 | 12/1907 | Leonard | 210/452 X |
| 1,555,574 | 9/1925 | Herrmann | 210/488 |
| 2,855,106 | 10/1958 | English | 210/492 |
| 2,875,594 | 3/1959 | Schilling | 210/305 X |
| 2,919,030 | 12/1959 | Grant et al. | 210/488 |
| 3,016,108 | 1/1962 | Myddelton | 55/387 |
| 3,722,189 | 3/1973 | Tourtellotte | 55/389 |
| 3,770,129 | 11/1973 | Brumfield et al. | 210/448 X |
| 3,992,886 | 11/1976 | Scott | 210/446 X |
| 4,043,918 | 8/1977 | Orona | 210/412 X |
| 4,157,902 | 6/1979 | Tokar | 55/385 B |
| 4,251,374 | 2/1981 | Cunningham | 210/232 |
| 4,285,500 | 8/1981 | Kock | 210/411 X |

*Primary Examiner*—Robert H. Spitzer
*Attorney, Agent, or Firm*—Ancel W. Lewis, Jr.

[57] ABSTRACT

A filtering apparatus suitable for being cleaned by backwashing includes an outer housing (11) and an inner filter (13) disposed in the outer housing defining an outer annular flow passage (16) and an inner flow passage (17). The outer housing is tapered in relation to the external shape of the filter to provide a substantially uniform liquid velocity through the filter in both forward flow and backflow directions. The filter is made up of a plurality of ring-like segments (38) stacked end to end on which a filter medium (37) is mounted.

5 Claims, 8 Drawing Figures

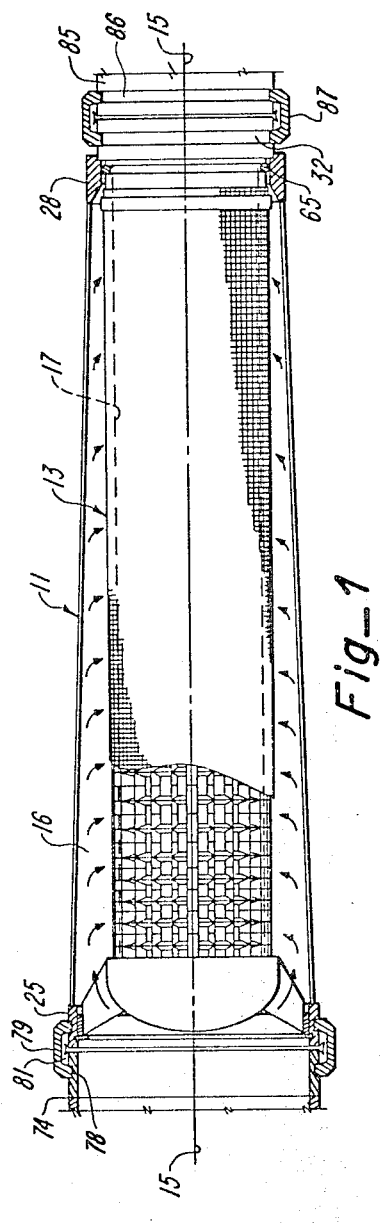

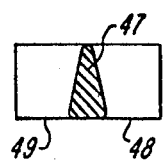
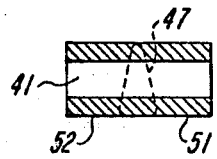
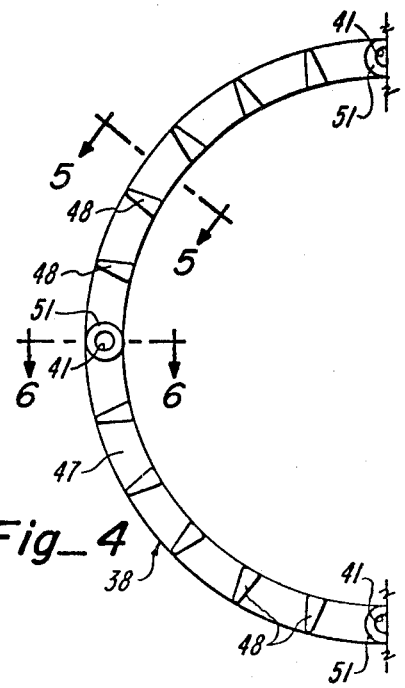
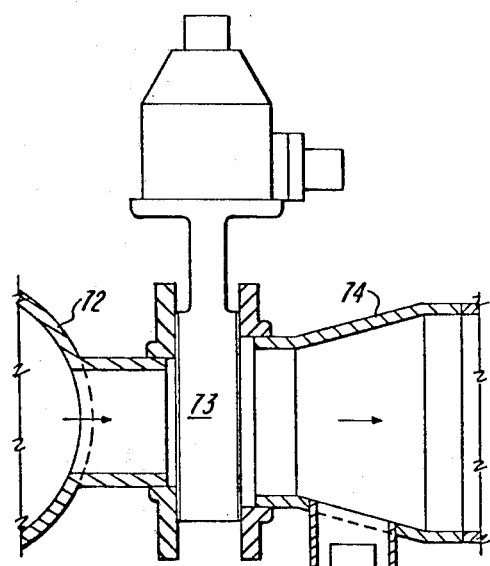
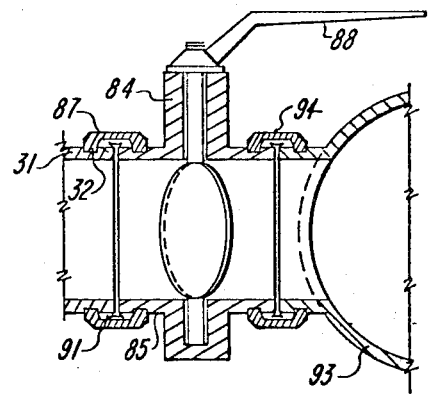
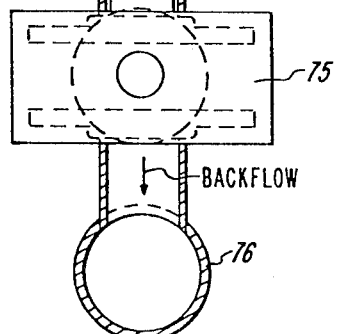

BACKWASHING-TYPE FILTERING APPARATUS WITH FILTER SUPPORT GRID OF RING-LIKE SEGMENTS

This application is a division of application Ser. No. 342,484, filed Jan. 25, 1982.

TECHNICAL FIELD

This invention relates to a novel and improved backwashing-type filtering apparatus that removes solid particles from a liquid.

BACKGROUND ART

Backwashing-type filters used in removing particles in liquid flow systems generally involve placing a filter in a large reservoir and allowing water to rush through the filter, depositing the particles on one face of the filter. Backwashing consists of a valve-controlled reverse flow, flushing the particles from the filter and carrying them to a drain. Refrigerating systems are one example of a liquid system wherein the liquid exposed to the atmosphere collects dirt, leaves, silt, ash, etc., as is discussed in U.S. Pat. No. 2,875,594. One problem prevalent in backwashing filters is that the surface area through which the liquid passes is usually long and generally tubular in shape and of substantial extent and the solid particles do not build up uniformly. Moreover, the backwashing liquid flow is not uniformly applied to the filter medium and difficulty is encountered in removing the particles.

Attempts have been made to provide a uniform liquid flow against the entire surface area of the filter medium. Hirs U.S. Pat. No. 3,169,109 discloses a tapered displacement member within an elongated cylindrical filter medium of uniform diameter throughout its length to uniformly distribute the water pressure over the entire area of the filter medium during a backwashing operation. A backwashing filter currently being manufactured by Ronnigen-Petter uses a backwash diffuser in the center of the filter medium that has a series of tapered sections that deflect the backwash flow to equalize fluid flow.

DISCLOSURE OF INVENTION

Filtering apparatus disclosed has the inner surface of a housing tapered in relation to the external dimension of a filter to define an annular outer flow passage that changes in dimension to decrease from an inlet end to an outlet end in the outer flow passage so as to provide a substantially uniform liquid velocity through the filter at all points along the filter during both forward flow and backflow operations. A support grid for the inner filter is comprised of a plurality of ring-like segments stacked end to end.

BRIEF DESCRIPTION OF DRAWINGS

The details of this invention will be described in connection with the accompanying drawings, in which:

FIG. 1 is a side elevation view of filtering apparatus embodying features of the present invention with the outer housing and end support for the filter shown in section and a portion of the filter medium broken away to show the support grid;

FIG. 2 is an enlarged vertical sectional view at the inlet end of the filtering apparatus shown in FIG. 1;

FIG. 3 is an enlarged vertical sectional view at the outlet end of the filtering apparatus shown in FIG. 1;

FIG. 4 is an end elevation view showing one half of a ring-like segment forming the support grid of the filter with the opposite half not shown but being identical in construction;

FIG. 5 is a sectional view taken along lines 5—5 of FIG. 4;

FIG. 6 is a sectional view taken along lines 6—6 of FIG. 4;

FIG. 7 is a vertical sectional view of a suitable valve control for use at the inlet of the filtering apparatus of FIG. 1; and FIG. 8 is a vertical sectional view of a suitable valve control for use at the outlet of the filtering apparatus of FIG. 1.

DETAILED DESCRIPTION

Referring now to the drawings, the filtering apparatus shown, generally stated, includes an outer housing 11 within which there is disposed an inner filter 13 arranged in inner spaced concentric arrangement about a common central axis 15 to define therebetween an annular outer flow passage 16. An inner flow passage 17 extends through the hollow core or inside of filter 13.

The outer flow passage 16 has an inlet 19 for flow in the axial direction into one end and the opposite end of the outer annular passage is closed to flow in the axial direction. The inner flow passage 17 within filter 13 is closed to flow in the axial direction at the inlet end and the outlet end 21 is open to flow in the axial direction so that in general the liquid passes via inlet 19, through the peripheral surface of the filter 13, through the hollow core or inner flow passage 17, and out outlet 21 in the forward flow direction, as is indicated by arrows.

The outer housing 11 shown in constructed with a shell 24 that is tapered throughout its lengthwise extent and has a tubular inlet pipe end 25 affixed to the inlet end of shell 24. The inlet pipe end 25 has an external groove 26 and an internal groove 27. A tubular pipe reducer 28 is affixed to the outlet end of the shell 24 and has a converging inner surface 29 and a straight inner surface 30. A tubular outlet pipe end 31 is affixed to the outlet end of reducer 28 and pipe end 31 has an external groove 32.

The filter 13 has an inner support grid 35. Filter 13 is of a generally cylindrical shape and has a substantially uniform diameter throughout its lengthwise extent. The support grid 35 has a plurality of openings 36 distributed substantially uniformly over the entire peripheral surface area extending from an outer surface to an inner surface thereof to pass a liquid therethrough. A filter medium 37 covers the entire peripheral surface of the support grid 35. The filter medium is a fabric or wire mesh or the like of a mesh size that will collect the solid particles on the external surface thereof.

The support grid 35 is made up of a plurality of identical ring-like segments 38 stacked end to end and held together by four circumferentially spaced tension rods 39 having external threads on both ends. Rods 39 extend through alined axial holes 41 in the segments and through a hole in a front end plate 43 and thread into internal threads in a hole in a rear end ring 44. A nut 45 threads over the externally threaded end portion of the tension rods beyond the front end plate so that the segments 38 are drawn tightly together between the front end plate 43 and rear end ring 44 as nuts 45 are tightened.

As best seen in FIGS. 4 and 5, each ring-like segment 38 includes a ring portion 47 that is continuous for a full arc of 360 degrees and a plurality of circumferentially spaced pairs of axial portions 48 and 49 that project from opposite sides of the ring portion 47. The cross section of both the ring portion 47 and the axial portions 48 and 49 is the same and somewhat V-shaped, being narrower at the outer surface and wider at the inner surface, with rounded corners to facilitate or enhance fluid flow.

As shown in FIGS. 4 and 6, the holes 41 that receive the tension bolt 39 are located at 90-degree intervals in the arc and are constructed as cylindrical body portions 51 and 52 that extend as a pair of axial portions projecting out from opposite sides of ring portion 47 in the same manner and to the same extent as axial portions 48 and 49.

A dome-shaped deflector plate 55 is mounted at the front end of the filter 13. Plate 55 has a tubular support section 57 affixed to and extending axially in front of the front end plate 43 and a tubular support 56 affixed to and extending rearwardly from the inside of deflector plate 55 and telescopes in support 56. Four relatively thin, circumferentially spaced, radial plates 58 are affixed at 90-degree intervals along an inner edge to the periphery of plate 55. An annular retainer 59 at the outer end telescopes in member 25 in a close-fitting relationship and is held against axial movement by a retaining ring 61 in groove 27.

The front end of the filter medium 37 is shown wedged between the inside of deflector plate 55 and the outside of end plate 43 to hold it to the support grid 35. The rear end of the filter medium 37 is held to the support grid by an external annular clamp 62 that forces it down against rear end ring 44. The rear end of the outer annular passage is sealed closed by an O-ring 65 that fits in an annular external groove 66 in rear end ring 44 and abuts against surface 30 of ring 28.

The outer housing 11 has an internal dimension related in a particular way to the external dimension of the filter 13 so that the outer flow passage 16 changes in dimension along the filter 13 to provide a substantially uniform liquid velocity at all points along the filter during either the forward or the backflow operating conditions.

In particular, the shell 24 is tapered a selected angle to converge from inlet to outlet to provide a selected fluid velocity for the flow through the outer annular passage, which in turn establishes a selected pressure along the outer annular passage during a forward flow operating condition. Moreover, a selected shell taper and thereby a selected width of the outer flow passage also provides a selected fluid velocity for the flow through the outer flow passage in the reverse direction. This in turn establishes a selected pressure along the inner flow passage 17 and these inner and outer fluid velocities and pressures are selected and established by the extent or size of the taper, so that the pressure differentials or pressure drops across the filter medium and thereby the liquid flow through the filter medium are the same throughout the lengthwise extent of the filter 13.

The difference between a tapered housing and an outer housing of uniform diameter throughout its length may be graphically illustrated along an x-y coordinate system that has liquid pressure plotted along the "y" axis and distance along the filter plotted along the "x" axis.

During a forward fluid flow operation the liquid pressure at the inlet of the outer flow passage 16 is at a certain pressure level and gradually decreases toward the outlet of the outer flow passage along a downsloping line. In turn, during a forward fluid flow operation the pressure at the inlet of the inner flow passage 17 gradually decreases toward the outlet 21 along a downsloping line, the taper of the housing being selected so that the plotted lines representing liquid pressure for the inner flow passage and outer flow passage are parallel, indicating the same differential pressure across the filter medium at all points along the filter medium.

A plot of liquid pressure for an outer shell of uniform dimension, rather than taper for the outer flow passage, would gradually increase from inlet to outlet along an upsloping line and would not result in a uniform pressure drop or differential along the filter.

The same factors are considered in selecting the taper of the outer housing during a backwash flow operation. In the inner passage the liquid pressure at the outlet 21 proceeding toward inlet 19 gradually increases toward the inlet 19 along an upsloping line. The taper of the shell 24 is selected with respect to backflow liquid velocity so that the pressure at the outlet in the outer passage 16 gradually increases along an upsloping line to a pressure at the inlet, and again the pressure lines for the inner and outer passages are parallel to indicate a uniform pressure drop along the filter. The pressure curve for an outer housing of uniform dimension would be along a downsloping curve from the outlet to the inlet of the outer passage and would not result in a uniform pressure drop along the filter.

A valving arrangement suitable for controlling liquid flow in both the forward and backflow operations for the above described filtering apparatus is illustrated in FIGS. 7 and 8. An inlet manifold 72 is coupled to an automatic inlet valve 73 which in turn is coupled to an inlet pipe 74 defining an inlet chamber. An automatic backflow valve 75 is connected to the inlet pipe 74 and connects to a backflow manifold 76.

The downstream end portion of inlet pipe 74 has an external groove 78, as seen in FIG. 1. A coupling ring 79 has an end portion that fits in groove 78 and groove 26 in the filtering apparatus to releasably couple the control valves 73 and 75 to the inlet end of the filtering apparatus 11. A joint sealant 81 is provided inside ring 79 to seal the joint between inlet pipe 74 and tubular pipe end 25 in a conventional manner.

At the outlet end of the filtering apparatus there is provided an outlet valve 84 having a pipe portion 85 with an annular groove 86. A coupling ring 87 has end portions that fit in groove 32 of said groove 86 to couple the outlet valve to the outlet end of the filtering apparatus. A handle 88 is used to turn valve 84 to open or closed positions as required. Again a sealant 91 is provided inside ring 87 to seal the joint between pipe end 31 and valve 84. The outlet valve 84 is then coupled to an outlet manifold 93 via a coupling ring 94 in a conventional manner.

OPERATION

During the forward flow filtering operation, liquid from the inlet manifold 72 flows through the normally open inlet valve 73 into inlet pipe 74 and then flows into outer annular passage 16 through filter 13, and into inner flow passage 47 in the core of the filter. This filtered liquid flows through outlet valve 84 and into outlet manifold 93 for intended use.

In the backwashing operation the valve 73 closes, shutting off forward flow through the filter. The backwash valve 75 opens to atmosphere, allowing water from the outlet manifold 93 to rush backwards through the filtering apparatus, washing debris off of the filter 13 and out through backwash valve 75, thus cleaning the filter.

By way of illustration and not by way of limitation, below is a table listing an example for the above described filtering apparatus for filtering out solid particles in a refrigeration system using water exposed to the atmosphere.

- Length of outer passage 16: 36 inches
- Internal diameter of outer passage at inlet 19: 6 inches
- Internal diameter of outer passage at inlet 21: 4½ inches
- Outer diameter of filter 13: 3¼ inches
- Fluid flow inlet 19 and outlet 21: 300 gpm Although the present invention has been described with a certain degree of particularity, it is understood that the present disclosure has been made by way of example and that changes in details of structure may be made without departing from the spirit thereof.

What is claimed is:

1. In a filtering apparatus for removing solid particles and the like from a liquid adapted to be cleaned by backwashing, the combination comprising:

an outer housing and an inner filter disposed within the outer housing defining therebetween an annular outer flow passage, said filter having an inner flow passage whereby a forward flow liquid with solid particles is passed through an inlet into said outer flow passage, the solid particles being deposited on said filter and the liquid passing through the filter into and along and out an outlet in said inner flow passage in the forward flow direction, and whereby a backwash liquid is passed into said inner flow passage, through said filter, and into said outer flow passage to remove solid particles collected on said filter in a backflow direction, said filter including an inner support grid having a plurality of liquid flow openings extending between the outer and inner faces to pass a liquid therethrough and a filter medium mounted on said support grid between said inner and outer flow passages, said support grid being made up of a plurality of ring-like segments, each segment having a centrally disposed ring portion that is continuous for a full arc of 360 degrests, and a plurality of circumferentially spaced pairs of axial portions projecting axially out from opposite sides of the ring portion and having flat ends that abut an adjacent axial portion of an adjacent ring for forming said liquid flow openings, said outer housing having an internal dimension related to the external dimension of said inner filter so that said outer flow passage changes in dimension along the filter in such a way as to provide substantially a uniform liquid velocity through said filter at all points along said filter in both said forward flow direction and said backflow direction.

2. In a filtering apparatus as set forth in claim 1 wherein said ring portion and said axial portions have a similar cross section, said cross section being generally V-shaped and narrower at the outer surface and wider at the inner surface of said support grid.

3. In a filtering apparatus as set forth in claim 1 wherein each ring-like segment has a pair of cylindrical portions at circumferentially spaced intervals coextensive with said axial portions through which tension rods extend and fasten to a front end plate and a rear end ring to hold said segments together.

4. In a filtering apparatus for removing solid particles and the like from a liquid adapted to be cleaned by backwashing, the combination comprising:

an outer housing and an inner filter disposed within the outer housing defining therebetween an annular outer flow passage, said filter having an inner flow passage whereby a forward flow liquid with solid particles is passed through an inlet into said outer flow passage, the solid particles being deposited on said filter and the liquid passing through the filter into and along and out an outlet in said inner flow passage in the forward flow direction, and whereby a backwash liquid is passed into said inner flow passage, through said filter, and into said outer flow passage to remove solid particles collected on said filter in a backflow direction, said filter including an inner, generally cylindrical, support grid body having a plurality of liquid flow openings extending between the outer and inner faces to pass a liquid therethrough and a filter medium mounted on said support grid between said inner and outer flow passages, said support grid being made up of a plurality of ring-like segments stacked end to end, each segment having a centrally disposed ring portion that is continuous for a full arc of 360 degress, and a plurality of circumferentially spaced pairs of axial portions of substantially equal length projecting axially out from opposite sides of the ring portion and having ends that abut an adjacent axial portion of an adjacent ring for forming said liquid flow openings, said outer housing having an internal dimension related to the external dimension of said inner filter so that said outer flow passage changes in dimension along the filter in such a way as to provide substantially a uniform liquid velocity through said filter at all points along said filter in both said forward flow direction and said backflow direction; and means to hold said segments together.

5. In a filtering apparatus as set forth in claim 4 wherein said ring portion and said axial portions have a similar cross section, said cross section being generally V-shaped and narrower at the outer surface and wider at the inner surface of said support grid, each ring-like segment having a pair of cylindrical portions at circumferentially spaced intervals coextensive with said axial portions through which a plurality of tension rods extend and fasten to a front end plate and a rear end ring to hold said segments together.

* * * * *